(12) United States Patent
L'Haridon et al.

(10) Patent No.: US 9,998,916 B2
(45) Date of Patent: Jun. 12, 2018

(54) PROCESS FOR PRESERVING THE PRIVACY OF A USER CONNECTED TO A NETWORK

(71) Applicant: Alcatel Lucent, Boulogne Billancourt (FR)

(72) Inventors: Sylvain L'Haridon, Nozay (FR); Serge Papillon, Nozay (FR); Wael Kanoun, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/303,850

(22) PCT Filed: Mar. 27, 2015

(86) PCT No.: PCT/EP2015/056778
§ 371 (c)(1),
(2) Date: Oct. 13, 2016

(87) PCT Pub. No.: WO2015/158529
PCT Pub. Date: Oct. 22, 2015

(65) Prior Publication Data
US 2017/0034695 A1  Feb. 2, 2017

(30) Foreign Application Priority Data
Apr. 16, 2014 (EP) .................................. 14305566

(51) Int. Cl.
*H04W 12/02* (2009.01)
*H04W 4/02* (2018.01)
*H04W 8/16* (2009.01)

(52) U.S. Cl.
CPC ............. *H04W 12/02* (2013.01); *H04W 4/02* (2013.01); *H04W 8/16* (2013.01)

(58) Field of Classification Search
CPC .......... H04W 12/02; H04W 4/02; H04W 8/16
(Continued)

(56) References Cited

U.S. PATENT DOCUMENTS

| 6,081,723 A | * | 6/2000 | Mademann | H04W 60/00 370/338 |
| 6,505,048 B1 | * | 1/2003 | Moles | H04W 4/02 455/421 |
| 6,662,014 B1 | * | 12/2003 | Walsh | H04L 63/0492 455/411 |

(Continued)

FOREIGN PATENT DOCUMENTS

| JP | 2006-252436 A | 9/2006 |
| JP | 2009-151370 A | 7/2009 |

(Continued)

OTHER PUBLICATIONS

International Search Report for PCT/EP2015/056778 dated Jul. 1, 2015.

*Primary Examiner* — Babar Sarwar
(74) *Attorney, Agent, or Firm* — Fay Sharpe, LLP

(57) ABSTRACT

Process for preserving the privacy of a user connected to a network through a terminal that comprises geolocation means adapted to emit geolocation information (2, 2*a*) about the geographical position of said user, said process providing for: —analyzing a packet (1) from said terminal to detect the eventual presence of geolocation information (2) into said packet; —replacing in said packet said detected geolocation information by virtual geolocation information (9, 9*a*) that have been computed for said user; —forwarding through said network said packet with said virtual geolocation information.

16 Claims, 1 Drawing Sheet

(58) Field of Classification Search
USPC ............ 455/404.2, 412.1–414.2, 418–422.1, 455/552.1, 456.1–457
See application file for complete search history.

(56) References Cited

U.S. PATENT DOCUMENTS

| | | | | |
|---|---|---|---|---|
| 7,433,370 | B1* | 10/2008 | Tymes | H04W 28/06 370/474 |
| 8,140,051 | B2* | 3/2012 | Yuuki | H04W 76/022 455/404.2 |
| 8,539,600 | B2 | 9/2013 | Oono | |
| 8,862,710 | B2* | 10/2014 | Gill | H04M 1/72572 370/328 |
| 2003/0008672 | A1* | 1/2003 | Fujii | H04L 63/08 455/456.1 |
| 2006/0233318 | A1* | 10/2006 | Ashley, Jr. | G01S 5/0027 379/45 |
| 2007/0264974 | A1* | 11/2007 | Frank | H04L 63/0407 455/411 |
| 2010/0076777 | A1* | 3/2010 | Paretti | G06Q 30/02 705/1.1 |
| 2013/0316726 | A1* | 11/2013 | Laws | H04W 4/02 455/456.1 |
| 2014/0059695 | A1* | 2/2014 | Parecki | G06F 21/60 726/26 |
| 2014/0162589 | A1* | 6/2014 | Gupta | H04W 64/003 455/404.2 |

FOREIGN PATENT DOCUMENTS

| | | |
|---|---|---|
| JP | 2012-155529 A | 8/2012 |
| WO | WO 2010/050195 A1 | 5/2010 |

* cited by examiner

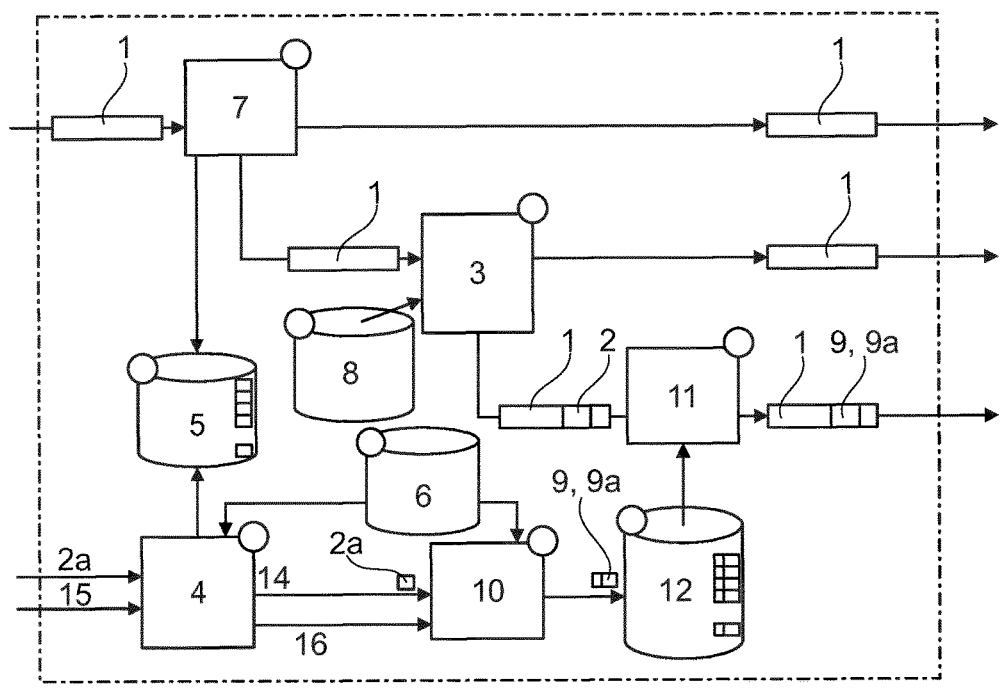

PROCESS FOR PRESERVING THE PRIVACY OF A USER CONNECTED TO A NETWORK

The invention relates to a process for preserving the privacy of a user connected to a network through a terminal that comprises means adapted to emit geolocation information about the geographical position of said user, such as architectures for implementing such a process.

With the continuous growth of network capacities and process power of mobile terminals, such as smartphones, lots of such mobile terminals are almost constantly connected to Internet.

This state of constant connection implies that mobile terminals should be adapted to benefit from a fast network connection while offering to their users the same quality of experience as fixed terminals such as desktop computers, and thus whatever the geographical position of said users.

On the other hand, with such a constant connection state, the concepts of security and privacy preservation are more than ever newsworthy, as for example in the case when personal information of a user should be exported towards an external service platform such as a cloud service platform.

Indeed, control of personal information of users is a very crucial issue, and said user can want to prohibit their disclosure in particular situations. Moreover, these new potential threats on users' privacy may make competent authorities to impose through legal requirements to provide technological means for ensuring protection of personal information in given contexts.

In particular, the type of personal information to be preserved can depend on the context of use of a service. Thus, a mobile terminal comprising geolocation means, notably implemented into an application of said terminal, can continuously emit geolocation information about the geographical position of a user, which can be considered as threatening for said user's privacy, especially when said user visits an health centre in order to get a medical treatment for serious disease.

To avoid such leaks of confidential geolocation information, a user may perform a manual procedure which consists in deactivating the geolocation means of his mobile terminal, as for example a GPS module (for Global Positioning System) implemented into said terminal, as soon as he enters into a confidential geographical zone.

However, this solution is not efficient in practice, as many users of such mobile terminals are not aware at all of which application(s) are running on their mobile terminals and which of said application(s) sends geolocation information to unknown servers, and many users are in general even not aware of privacy issues.

Moreover, with the raise of computing power and of "Big Data" datasets (that are too huge to be efficiently managed by classical database management means), if a user cuts off suddenly the geolocation means of his mobile terminal, he may unintentionally create a very distinguishable and suspicious pattern of behaviour that may trigger an unwanted research for confidential locations in the vicinity of the last known geographical position of said user and thus may nullify the attempt of said user for protection of his privacy.

The invention aims to improve the prior art by proposing a solution for offering to users of terminals equipped with geolocation means specific technical means for controlling the communication of geolocation information about their geographical position, said control being enforceable conformably to said users' willing or legal requirements.

For that purpose, and according to a first aspect, the invention relates to a process for preserving the privacy of a user connected to a network through a terminal that comprises geolocation means adapted to emit geolocation information about the geographical position of said user, said process providing for:
 analysing a packet from said terminal to detect the eventual presence of geolocation information into said packet;
 replacing in said packet said detected geolocation information by virtual geolocation information that have been computed for said user;
 forwarding through said network said packet with said virtual geolocation information.

According to a second aspect, the invention relates to an architecture for preserving the privacy of a user connected to a network through a terminal that comprises geolocation means adapted to emit geolocation information about the geographical position of said user, said architecture comprising:
 a detection device comprising means for analysing a packet sent by said terminal to detect the eventual presence of geolocation information into said packet;
 a computing device comprising means for computing virtual geolocation information for said user;
 a patching device comprising means for replacing in said packet said detected geolocation information by said virtual geolocation information and means for forwarding through said network said packet with said virtual geolocation information.

According to a third aspect, the invention relates to an architecture for preserving the privacy of a user connected to a network through a terminal that comprises geolocation means adapted to emit geolocation information about the geographical position of said user, said architecture comprising:
 a service platform embedded into said network and comprising a computing device which comprises means for computing virtual geolocation information for said user;
 a device embedded into said terminal, said device comprising:
  means for analysing a packet to be sent by said terminal to detect the eventual presence of geolocation information into said packet;
  means for requesting to the computing device computation of virtual geolocation information for said user upon said detection;
  means for replacing in said packet said detected geolocation information by said virtual geolocation information;
  means for forwarding through said network said packet with said virtual geolocation information.

According to a fourth aspect, the invention relates to an architecture for preserving the privacy of a user connected to a network through a terminal that comprises geolocation means adapted to emit geolocation information about the geographical position of said user, said architecture comprising:
 a service platform embedded into said network and comprising a computing device which comprises means for computing virtual geolocation information for said user;
 a network equipment comprising:
  means for analysing a packet to be sent by said terminal to detect the eventual presence of geolocation information into said packet;

means for requesting to the computing device computation of virtual geolocation information for said user upon said detection;

means for replacing in said packet said detected geolocation information by said virtual geolocation information;

means for forwarding through said network said packet with said virtual geolocation information.

Other aspects and advantages of the invention will become apparent in the following description made with reference to the appended FIGURE, which represents schematically an architecture for implementing a process according to the invention.

In relation to this FIGURE, a process for preserving the privacy of a user connected to a network through a terminal that comprises geolocation means adapted to emit geolocation information about the geographical position of said user, such as architectures for implementing such a process, would be described below.

The terminal of the user can be notably a mobile terminal such as a smartphone, and the geolocation means can be embedded into a dedicated module implemented into said terminal, such as a GPS module (for Global Positioning System). Moreover, the geolocation information provided by such geolocation means can be geographical coordinates of the geographical position of the user.

The user is notably connected to a network for sending packets 1 through said network, said packets comprising notably data provided by specific applications implemented on the terminal of said user, such as for example a multimedia player application. In particular, the packets 1 can be encoded with a format according to the Internet Protocol (IP). Moreover, applications of the terminal can require geolocation information about the geographical position of the user, so as to embed such geolocation information into their packets 1 to be sent.

In relation to the FIGURE, an architecture is provided for preserving the privacy of the user (not represented). The architecture can be implemented into the network to which the user is connected through his terminal, especially into an access node of said network, so as to preserve the privacy of users located in a geographical zone covered by said access node, or even deeper into said network, as for example into an aggregation node that encompasses geographical zones covered by several access nodes, so as to preserve the privacy of users wandering into said group of geographical zones.

In particular, the architecture can comprise means for allowing users to subscribe to the service for privacy preservation it implements. To do so, the architecture can be notably implemented by a telephony operator which can provide this service to its subscribers.

The process provides for analysing a packet 1 from the terminal to detect the eventual presence of geolocation information 2 into said packet. To do so, the architecture comprises a detection device 3 comprising means for analysing a packet 1 sent by the terminal to detect the eventual presence of geolocation information 2 into said packet.

According to an embodiment, the process prior provides for allowing the registration of the user and for checking the registration of said user upon reception of a packet 1 from said user, said packet being analysed or not for detection of eventual geolocation information 2 according to said checking.

To do so, the architecture comprises a registration device 4 comprising means for prior allowing a registration of the user, such as means for storing information about said user into a client database 5 upon said registration. Moreover, the registration device 4 comprises means for implementing a user interface, such as for example a Graphical User Interface (GUI), said interface enabling the user to register to benefit from protection of his privacy.

In particular, the user can register by previously selecting predefined geographical zones that are commonly considered as confidential and/or for which he wants to benefit from the privacy preservation service. Thus, as soon as the user enters such a selected geographical zone, the process will trigger automatically, and said user can be informed of that by the sending of a dedicated notification on his terminal.

The process can also provide, for each user sending packets 1 and being not registered, for tracking geolocation information 2a of said user and for estimating the confidentiality of said tracked geolocation information, and thus for sending to said user a notification for registration according to said estimation, said user being registered according to the response of said user to said notification.

To do so, the registration device 4 comprises means for tracking, for each user sending packets and being not registered, geolocation information 2a of said user. In particular, the registration device 4 can track geolocation information 2a of a user that just enters into the geographical zone or group of geographical zones covered by the node into which the architecture is implemented.

Moreover, the registration device 4 comprises means for estimating the confidentiality of the tracked geolocation information 2a.

To do so, the architecture comprises a confidential database 6 for storing identified confidential geolocation information. This confidential geolocation information can notably correspond to geographical zones that are commonly considered as confidential, such a health centres, and can be pre-recorded into the confidential database 6.

In particular, the identified confidential geolocation information can be recorded in the database 6 by an administrator of the architecture, and notably by an administrator of the telephony operator that implements said architecture. The stored confidential geolocation information can also be obtained from another open source global database, or even from other users, for example through social network services providers.

Moreover, the registration device 4 comprises means for comparing tracked geolocation information 2a with confidential geolocation information stored in the confidential database 6, so as to estimate the confidentiality of said tracked geolocation information upon said comparison, notably according to the presence or not into said database of an entry that matches with the tracked geolocation information 2a.

The registration device 4 also comprises means for sending to the user a notification for registration according to the above confidentiality estimation, so that said registration device will register information about the user into the client database 5 according to the response of said user to said notification.

In particular, if the tracked geolocation information 2a is not confidential, the registration device 4 sends no notification to the user, whereas said registration device sends such a notification to said user if said tracked geolocation information is confidential.

Moreover, if the user gives back a negative response to the notification, the registration device 4 does not registers information about said user into the client database 5, whereas said registration device registers information about said user into said client database if said user gives back a positive response.

To do so, the registration device 4 can send a notification that is adapted to trigger the display on the terminal of the user of a window comprising a text message for warning said user that he just enters into a confidential geographical zone, such as interactive buttons for allowing said user to give back a positive response ("Yes" button) or a negative response ("No" button) to the registration proposition.

Thus, any user entering into a confidential zone covered by the architecture can be warned about the existence of a service for preserving his privacy and can simply benefit from said service by positive answering to the notification.

The architecture also comprises a switch device 7 comprising means for receiving a packet 1 sent by a user and means for checking in the client database 5 the presence of information about said user, said switch device further comprising means for forwarding or not said packet to the detection device 3 according to the presence or not of such information about said user into said client database.

More precisely, the switch device 7 gets a packet 1 arriving at a node wherein the architecture is implemented and checks in the client database 5 the eventual presence of information about the user who sent said packet, as for example the presence or not of an identifier (ID) of said user. If the client database 5 contains such information, the switch device 7 forwards the packet 1 to the detection device 3. Otherwise, the switch device 7 forwards the packet to common treatment by the node, and the process stops.

For the detection of geolocation information 2, the architecture comprises a format database 8 for storing rules for geolocation pattern matching, such as means for updating said format database as an application sends geolocation information 2 into a new format, so as to take said new format into account for further geolocation information 2 detection. Moreover, the detection device 3 is adapted to interact with the format database 8 so as to detect the eventual presence of geolocation information 2 into the packet 1.

Thus, if the packet 1 contains at least one geolocation information 2, the detection module forwards said packet to further steps of the process according to the invention, along with other information about said geolocation information, such as their offset, their length or their type. Otherwise, the detection module 3 forwards the packet 1 to common treatment by the node wherein the architecture is implemented, and the process stops.

Once geolocation information 2 has been detected, the process provides for replacing said detected geolocation information by virtual geolocation information 9 that have been computed for the user.

To do so, the architecture comprises a computing device 10 comprising means for computing virtual geolocation information 9 for the user, such as a patching device 11 comprising means for replacing in the packet 1 forwarded by the detection module 3 detected geolocation information 2 by said computed virtual geolocation information.

In particular, the registration device 4 comprises means for sending to the computing device 10 a notification 14 for starting computation of virtual geolocation information 9 for a user upon registration of said user, said notification comprising notably the tracked geolocation information 2a of the user at the time of said registration.

Moreover, the process provides for storing into a virtual location database 12 the computed virtual geolocation information 9 associated with the user, so as to replace in the packet 1 detected geolocation information 2 by virtual geolocation information 9 retrieved from said virtual location database.

To do so, the architecture comprises such a virtual location database 12 and the computing device 10 comprises means for storing into said virtual location database the computed virtual geolocation information 9 associated with the user, for example by registering said virtual geolocation information along with the identifier (ID) of said user. Moreover, the patching device 11 comprises means for interacting with the virtual location database 12 for replacing into the packet 1 detected geolocation information 2 by virtual geolocation information 9 retrieved from said virtual location database, for example by using as a key the identifier (ID) of the user contained in said packet.

In particular, the process provides for computing in a relevant manner virtual geolocation information 9 for the user.

To do so, the computing device 10 may accurately take into account the geolocation information 2a of said user that are tracked by the registration device 4 and communicated to said computing device through the notification 14. In particular, the computing device 10 may provide virtual geolocation information 9 corresponding obviously to a geographical position located outside of the geographical zones that are identified as confidential, for example by further checking of the confidential database 6.

Moreover, the computing device 10 may provide consecutive virtual geolocation information 9 that are coherent relative to each other. To do so, the computing device 10 may implement a clock function that triggers regularly the recalculation of virtual geolocation information 9 and store it into the virtual location database 12 along with the identifier of the user.

For plausible virtual geolocation information 9, the computing device 10 can implement computation algorithms adapted to simply simulate the user randomly wandering by foot in the geographical zone covered by the node wherein the architecture is implemented. To do so, such algorithms may notably use regional maps that are very similar to those used by common GPS (Global Positioning System) modules embedded into mobile terminals.

The computing device 10 can also implement more advanced algorithms that take advantage of Point Of Interest (POI) databases, as those which are used by GPS modules. In particular, these algorithms may compute a virtual path for a user towards such a point of interest, as for example a restaurant, a mall or a theatre, and thus establish a virtual geographical position 9 which stays some time near said point of interest.

For a more plausible computation, the user can precise, notably during his registration, the time he intends to stay in the confidential zone he has entered, so that the algorithms may choose a relevant point of interest compatible with said precised time. For example, if the user precises that he may stay around three hours in the confidential zone he entered, the algorithms may simulate a stay into a movie theatre.

The computing device 10 can also implement means for leveraging social network like systems and for computing virtual geolocation information 9 for a user that is based on geolocation habits from other users in the vicinity.

The process can also provide, for each registered user sending packets 1, for tracking geolocation information 2a of said user and for estimating the confidentiality of said tracked geolocation information, virtual geolocation information 9 further being computed according to said estimation.

To do so, the registration device 4 comprises means for tracking geolocation information 2a of each registered user sending packets 1, such as means for estimating the confidentiality of said tracked geolocation information, notably by comparing said tracked geolocation information with geolocation information stored in the confidential database 6. Moreover, the computing device 10 is adapted to compute virtual geolocation information 9 for the user according to the estimation made by the registration module 4.

In particular, the process can stop upon unregistration of the user, said unregistration occurring notably when the latest tracked geolocation information 2a of said user is not confidential whereas the preceding one was confidential, i.e. when said user quits a confidential geographical zone, or upon manual intervention of said user, notably by the sending of a request 15 for unregistration by said user or by the ending of a time limited registration that was set by the user himself.

To do so, the registration device 4 comprises means for unregistering the user, notably automatically, when the latest tracked geolocation information 2a of said user is not confidential whereas the preceding one was confidential, such as means for allowing the user to manually intervene for his unregistration, for example by sending a request 15 for unregistration or by setting a time limited registration.

Afterwards, the registration device 4 sends to the computing device 10 a notification 16 for indicating the unregistration of the user, and the computing device 10 stops calculating virtual geolocation information 9 for said user, so that packets 1 of said user will further be sent with the real geolocation information 2 of said user.

However, an abrupt stopping is not desirable, as it should provoke a teleport effect into the geolocation information 2, 9 communicated for the user into packets 1 from said user, which is an critical inconvenient for preserving the privacy of said user.

To avoid such a drawback, the process provides for computing additional virtual geolocation information 9a for the user upon unregistration of said user, said additional virtual geolocation information creating a realistic virtual path between the latest virtual geolocation information 9 computed for said user at the time of said unregistration and ulterior tracked geolocation information 2a of said user.

Moreover, the computing device 10 comprises means for triggering a virtual path module upon unregistration of a user. This virtual path module, which is notably implemented into the computing module 10, comprises means for computing additional virtual geolocation information 9a for creating a realistic virtual path between the latest virtual geolocation information 9 computed for the user at the time of his unregistration and ulterior tracked geolocation information 2a of said user.

In particular, the virtual path module is adapted, once triggered, to compute additional virtual geolocation information 9a that track the real geolocation information 2a of the user at a plausible speed, for example by using at least one of the above mentioned computing algorithms, so as to avoid unrealistic teleport effect or light-speed running effect. Thus, once additional virtual geolocation information 9a is very near real geolocation information 2a of the user, the computing device 10 stops computing and the process stops. Moreover, both of the computing module 10 and the registration module 4 are triggered to delete any information about the user that is stored into the client database 5 and the virtual location database 12.

In the particular case of a time limited registration, the computing device 10 can also compute virtual geolocation information 9 for creating a realistic path towards an exit of the confidential zone at the estimated time of unregistration, so that the virtual path module could be more efficient.

Once suitable virtual geolocation information 9, 9a has been computed and stored into the virtual location database 12, the patching device 11 can interact with said database to retrieve such virtual geolocation information 9, 9a for patching it instead of real geolocation information 2 detected into a packet 1.

In particular, the patching device 11 is adapted to replace in the packet 1 detected geolocation information 2 by virtual geolocation information 9, 9a with a suitable format for said packet. Indeed, the virtual geolocation information 9, 9a are computed internally with particular format, as for example a latitude/longitude format, whereas the geolocation information 2 inserted in packets 1 can be found with other types of format, such as the Universal Transverse Mercator (UTM) format.

To do so, the patching device 11 comprises means for translating computed virtual geolocation information 9, 9a from the internally used format to any format found in packets 1. Once it is done, the patching device 11 patches into the packet 1 virtual geolocation information 9, 9a at the right offset and right length. Moreover, the patching device 11 is adapted to update itself for taking into account any new format used for geolocation information 2 inserted into packets 1.

Afterwards, the process provides for forwarding through the network the packets 1 with the virtual geolocation information 9, 9a, and the patching device 11 comprises to that effect means for such a forwarding.

With such an architecture, the privacy of a user can be preserved without any modification at the level of the terminal of said user. All of the steps of the process are lead at the level of the network in an un-intrusive way.

According to another embodiment (not shown), an architecture implemented partly in both of the network and the terminal of the user can be provided. This architecture can notably comprise:
- a service platform embedded into said network and comprising a computing device which comprises means for computing virtual geolocation information for said user;
- a device embedded into said terminal, said device comprising:
    means for analysing a packet to be sent by said terminal to detect the eventual presence of geolocation information into said packet;
    means for requesting to the computing device computation of virtual geolocation information for said user upon said detection;
    means for replacing in said packet said detected geolocation information by said virtual geolocation information;
    means for forwarding through said network said packet with said virtual geolocation information.

In particular, the device is implemented at a firmware level into the terminal and connects to the computing device upon demand of the user for requesting computation of virtual geolocation information for said user, so that the patching of virtual geolocation information into a packet will be done at the level of the terminal of the user, and this for all packets sent by any application using geolocation means of said terminal.

Thus, the device can propose the privacy preservation service for many different application that are running on the terminal of the user, and even for encrypted applications, the sent packets 1 thereof are secured and notably not easily alterable.

To do so, the device can be implemented in a driver of the terminal by means of a dedicated additional code.

The computed virtual geolocation information can be stored into a virtual location database as presented above wherein the device does periodically lookups for replacing real geolocation information in packets to be sent. In a variant, the computing device can send periodically virtual geolocation information to the device.

According to another embodiment, a similar architecture can be implemented totally in the network, said architecture comprising:
- a service platform embedded into said network and comprising a computing device which comprises means for computing virtual geolocation information for said user;
- a network equipment comprising:
  - means for analysing a packet to be sent by said terminal to detect the eventual presence of geolocation information into said packet;
  - means for requesting to the computing device computation of virtual geolocation information for said user upon said detection;
  - means for replacing in said packet said detected geolocation information by said virtual geolocation information;
  - means for forwarding through said network said packet with said virtual geolocation information.

Generally speaking, the proposed solution allows to protect efficiently the privacy of geolocation information 2, 2a of users, and thus without having to turn off the geolocation means of their terminals, and whatever the number of application running on said terminal which use such geolocation means. In particular, by preventing the turning off of the geolocation means, many application using such means may be allowed to run as intended.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to assist the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A process for preserving the privacy of a user connected to a network through a terminal that comprises a geolocation part adapted to emit geolocation information about the geographical position of said user, said process comprising:
    analysing a packet from said terminal to detect a presence of geolocation information in said packet;
    in response to detecting the presence of geolocation information in the packet as a result of said analysing, replacing in said packet said detected geolocation information with virtual geolocation information that have been computed for said user; and
    forwarding through said network said packet with said virtual geolocation information.

2. The process according to claim 1, wherein it prior provides for allowing the registration of a user and for checking the registration of a user upon reception of a packet from said user, said packet being analysed or not for detection of geolocation information according to said checking.

3. The process according to claim 2, wherein it provides, for each user sending packets and being not registered, for tracking geolocation information of said user and for estimating the confidentiality of said tracked geolocation information, and thus for sending to said user a notification for registration according to said estimation, said user being registered according to the response of said user to said notification.

4. The process according to claim 2, wherein it provides, for each user sending packets and being registered, for tracking geolocation information of said user and for estimating the confidentiality of said tracked geolocation information, virtual geolocation information further being computed according to said estimation.

5. The process according to claim 4, wherein it provides for unregistering the user when the latest tracked geolocation information of said user is not confidential whereas the preceding tracked geolocation information of said user was confidential.

6. The process according to claim 5, wherein it provides for computing additional virtual geolocation information for the user upon unregistration of said user, said additional virtual geolocation information creating a realistic virtual path between the virtual geolocation information computed for said user at the time of said unregistration and ulterior tracked geolocation information of said user.

7. The process according to claim 2, wherein it provides for unregistering the user upon manual intervention of said user.

8. An architecture for preserving the privacy of a user connected to a network through a terminal that comprises a geolocation part adapted to emit geolocation information about the geographical position of said user, said architecture comprising:
    a detection device that analyses a packet sent by said terminal to detect a presence of geolocation information in said packet;
    a computing device that computes virtual geolocation information for said user;
    a patching device that, in response to detecting the presence of qeolocation information in the packet as a result of said analyses by the detection device, replaces in said packet said detected geolocation information with said virtual geolocation information and forwards through said network said packet with said virtual geolocation information.

9. The architecture according to claim 8, wherein the computing device comprises a virtual location database into which is stored the computed virtual geolocation information associated with the user, the patching device comprising an interface which interacts with said virtual location database for replacing into a packet detected geolocation information with virtual geolocation information retrieved from said virtual location database.

10. The architecture according to claim 8, wherein it further comprises:
    a registration device that prior allows a registration of a user, including a storage device that stores information about said user in a client database upon said registration;

a switch device that receives a packet sent by a user and checks in the client database the presence of information about said user, said switch device further operative to forward or not said packet to the detection device according to the presence or not of such information about said user in said client database.

11. The architecture according to claim 10, wherein the registration device comprises a tracking part that tracks, for each user sending packets and being not registered, geolocation information of said user and an estimating part that estimates the confidentiality of said tracked geolocation information, including a sending part that sends to said user a notification for registration according to said estimation, information about said user being registered into the client database according to the response of said user to said notification.

12. The architecture according to claim 11, wherein the registration device comprises a tracking part that tracks, for each user sending packets and being registered, geolocation information of said user and an estimating part that estimates the confidentiality of said tracked geolocation information, the computing device being adapted to compute virtual geolocation information for said user according to said estimation.

13. The architecture according to claim 12, wherein the registration device comprises an unregistering part that unregisters the user when the latest tracked geolocation information of said user is not confidential whereas the preceding tracked geolocation information of said user was confidential.

14. The architecture according to claim 13, wherein the computing device comprises a trigger that triggers a virtual path module upon unregistration of a user, said virtual path module being operative to compute additional virtual geolocation information for creating a realistic virtual path between the latest virtual geolocation information computed for said user at the time of said unregistration and ulterior tracked geolocation information of said user.

15. An architecture for preserving the privacy of a user connected to a network through a terminal that comprises a qeo-locater that emits geolocation information about the geographical position of said user, said architecture comprising:
   a service platform embedded in said network and operative to compute virtual geolocation information for said user; wherein
   said terminal is operative to:
      analyse a packet to be sent by said terminal to detect a presence of geolocation information in said packet;
      request computation of virtual geolocation information for said user upon said detection of the presence of geolocation information in the packet as a result of said analysis;
      replace in said packet said detected geolocation information with said virtual geolocation information; and
      forward through said network said packet with said virtual geolocation information.

16. An architecture for preserving the privacy of a user connected to a network through a terminal that comprises a qeo-locater that emits geolocation information about the geographical position of said user, said architecture comprising:
   a service platform embedded in said network and operative to compute virtual geolocation information for said user; and
   network equipment operative for:
      analysing a packet to be sent by said terminal to detect the eventual presence of geolocation information into said packet;
      requesting computation of virtual geolocation information for said user upon said detection of the presence of geolocation information in the packet as a result of said analysing;
      replacing in said packet said detected geolocation information with said virtual geolocation information; and
      forwarding through said network said packet with said virtual geolocation information.

* * * * *